(No Model.)

N. G. WILLIAMS.
CENTRIFUGAL MACHINE.

No. 565,196. Patented Aug. 4, 1896.

Witnesses:
John Buckler,
A. C. Tanner

Inventor:
Nathan G. Williams
By Simonds, Burdett & Bottingham
his Attorneys

UNITED STATES PATENT OFFICE.

NATHAN G. WILLIAMS, OF BELLOWS FALLS, VERMONT.

CENTRIFUGAL MACHINE.

SPECIFICATION forming part of Letters Patent No. 565,196, dated August 4, 1896.

Application filed March 19, 1894. Serial No. 504,171. (No model.)

*To all whom it may concern:*

Be it known that I, NATHAN G. WILLIAMS, of Bellows Falls, in the county of Windham and State of Vermont, have invented a certain new and useful Improvement in Centrifugal Machines, specially useful in separating cream from milk, of which the following is a description, reference being had to the accompanying drawings, wherein—

Figure 1:
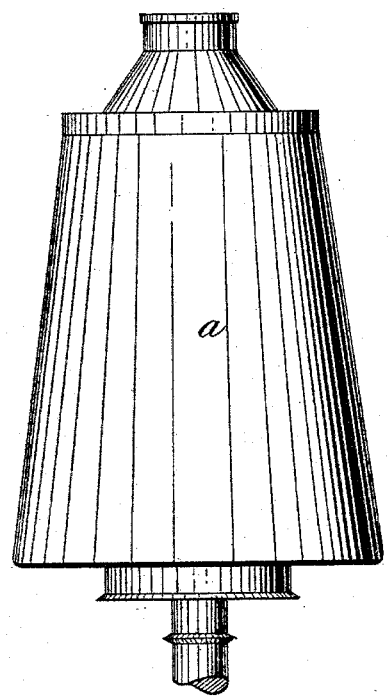
Figure 2:
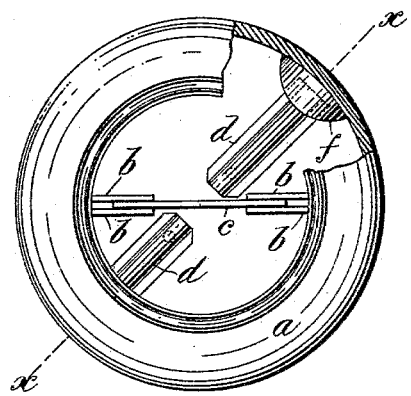
Figure 3:
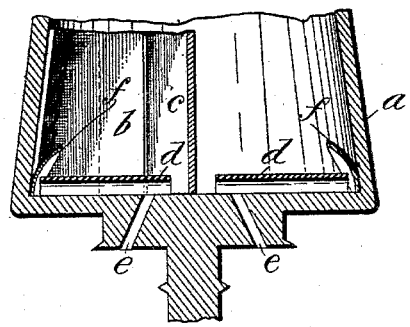

Figure 1 is a side view or elevation of a rotary bowl of such a centrifugal machine. Fig. 2 is a top or plan view of the same with the cover removed, looking down into the interior of the bowl, with a side portion broken away so as to show the construction at the outer end of one of the skim-milk tubes. Fig. 3 is a view in central vertical section of the lower part of the bowl on the plane denoted by dotted line $x\,x$, cutting the skim-milk tubes longitudinally.

The object of the improvement is to increase the strength of the current through the skim-milk tubes and to prevent the outer (the inlet) ends of such tubes from becoming clogged by the sediment which is derived from the milk and deposited on the inner wall of the bowl during the use and operation of the bowl.

Other parts than the swiftly-rotating bowl (and its metallic interior parts) are not shown, because they lie outside of the scope of my invention.

The letter $a$ denotes such swiftly-rotating bowl, fast on the inner wall of which are the two vertical guides $b$, which serve as ways for the diaphragm $c$, the edges of which are grooved to embrace such ways. By means of this arrangement and construction the diaphragm can be set in place for use and removed—*i. e.*, pulled upward and outward of the mouth of the bowl—to facilitate the cleansing of the interior of the bowl. This diaphragm, when in place, practically divides the bowl-chamber into compartments, preventing the contained liquid from escaping the rotary grasp of the bowl and forcing such contents into a speed of rotation which is practically uniform throughout the mass, a speed practically the same as that of the bowl itself. In doing this there is presented the formation of a sort of central core of liquid rotating at a distinctly different speed than the layer outside of it.

The letter $d$ denotes the skim-milk tubes. The skim-milk enters them at the outer end, traverses them, and escapes from the bowl through the conduits $e$.

The letters $f$ denote shields for the outer ends of the skim-milk tubes. In their preferred form they extend in a direction approximately midway of the floor and the interior wall of the bowl. One effect of these shields is to increase the strength of the current of skim-milk flowing through the skim-milk tubes. Another effect—and probably for this purpose the two effects are more or less interacting or cumulative—is to prevent a certain deposit which is derived from the milk and deposited on the interior wall from clogging the inlets at the outer ends of the skim-milk tubes.

The shields $f$ are adjacent to the walls of the bowl, and the inlet ends (the outer ends) of the skim-milk tubes are brought as near such wall as is consistent with the freedom of delivery of the skim-milk thereto.

I claim as my improvement—

1. In a cream-separator, the combination of the bowl $a$, the exit-tubes $d$ for the escape of the skim-milk, and the shields $f$ located adjacent to the inner wall of the bowl and also adjacent to the inlet ends of said tubes, all substantially as described and for the purpose set forth.

2. In a cream-separator, the combination of the bowl $a$, exit-tubes $d$ for the escape of the skim-milk, and shields $f$ partly inclosing the inlet ends of said tubes, all substantially as described and for the purposes set forth.

NATHAN G. WILLIAMS.

Witnesses:
FRANK G. DAY,
A. J. HOLLEY.